United States Patent [19]

Heard

[11] Patent Number: 4,671,655
[45] Date of Patent: Jun. 9, 1987

[54] EXPOSURE METER

[75] Inventor: Maurice C. Heard, Hullbridge, England

[73] Assignee: The General Electric Company p.l.c., London, England

[21] Appl. No.: 721,751

[22] Filed: Apr. 10, 1985

[30] Foreign Application Priority Data

Apr. 12, 1984 [GB] United Kingdom ................. 8409452

[51] Int. Cl.⁴ ............................................. G03B 7/08
[52] U.S. Cl. .................................... 356/227; 356/218; 354/474; 354/475
[58] Field of Search ....................... 356/227, 222, 218; 354/289.12, 474, 475; 446/560

[56] References Cited

U.S. PATENT DOCUMENTS

| | | | |
|---|---|---|---|
| 4,182,573 | 1/1980 | Yamada et al. ................. | 354/474 X |
| 4,364,650 | 12/1982 | Terashita et al. ................. | 354/31 |
| 4,395,099 | 7/1983 | Terashita ............................. | 354/31 |

FOREIGN PATENT DOCUMENTS 0693443  7/1953  United Kingdom .

OTHER PUBLICATIONS

Camera Report, Nilson FA-Part Two, L. Andrew Mannheim.

Primary Examiner—Eugene R. Laroche
Assistant Examiner—Robert J. Pascal
Attorney, Agent, or Firm—Spencer & Frank

[57] ABSTRACT

An exposure meter includes a display device 16 on which is displayed a histogram 17. The x axis is divided into cells representing ranges of possible luminance values. The height (i.e., y value) of each cell of the histogram represents the number of individual areas within the scene to be photographed whose luminance falls within that cell. Alongside the histogram, a bar 18 is displayed representing the range of luminance values which can be photographed, this being calculated according to the film characteristics, shutter speed and aperture size. The information displayed at 16 is provided by a processor which receives information from a keyboard 12 and a color camera photosensor onto which is focused an image of the scene to be photographed.

8 Claims, 1 Drawing Figure

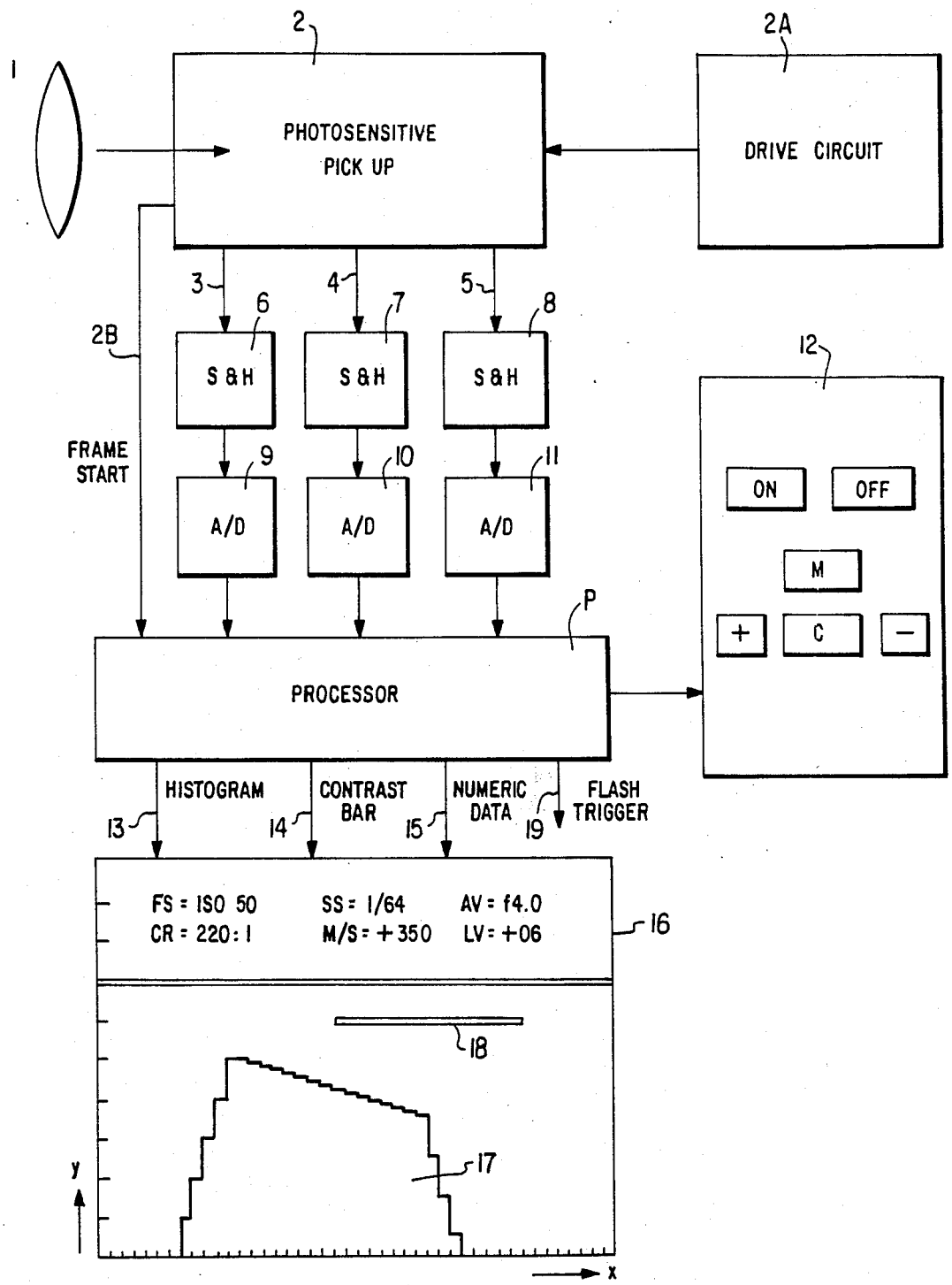

EXPOSURE METER

BACKGROUND OF THE INVENTION

This invention relates to an exposure meter for use by photographers and arose with a view to providing an indication of the distribution of luminance values over a field of view, rather than just the luminance of one particular part of the field of view.

We did endeavor to meet this requirement in the past using a somewhat unconventional arrangement described in our Patent Specification GB No. 693443. This displays a graph of brightness vs. horizontal angle of view. The value of the horizontal angle of view is however of no value to the user of the instrument and the brightness values, being only average values for vertical strips of the field of view, are of limited value since they could include bright areas of sky and dark shadows on the ground.

A conventional spot exposure meter has a narrow field of view compared with a scene to be photographed and provides a single output measurement representing the luminance of one particular part of the scene. In order to obtain an indication of the contrast of the scene the conventional spot exposure meter must be pointed in successive different directions and the different measurements obtained must be noted by the photographer. In a more sophisticated known system the exposure meter has a wider field of view covering the whole of a scene to be photographed and includes six photocells which provide respective luminance values for six shaped sectors of the field of view. A decision on the required exposure is made automatically on the basis of the six measured values, knowledge of the type of scene (e.g., portrait, outdoor daylight scene etc.) which is entered manually by the photographer, and various assumptions concerning the likely content (e.g. sky) and photographic importance of features in the different sectors. This automatic system is recognized as suffering from certain drawbacks. For example it does not allow for unusual types of scene or for the achievement of special dramatic or unusual photographic effects. For these reasons a special switch is provided to prevent the above automatic system from operating when not required.

SUMMARY OF THE INVENTION

This invention provides an exposure meter comprising: means for deriving different values defining the brightness of different parts of a field of view; means defining a number of cells into which the said brightness values may fall; and means for providing measures of the number of said brightness values in each cell.

The measures of the number of brightness values in each cell are preferably displayed to the operator thereby giving him a useful indication both of the overall luminance and of the distribution of luminance over the field of view. The display is preferably in the form of a histogram since this allows the information to be readily assimilated by the photographer. A similar display is preferably arranged alongside the histogram, showing the range of luminance values which can be handled by the particular film in use at the current aperture and exposure settings of a camera. A facility has to be provided of course for details of the type of film and aperture and exposure settings to be entered either automatically or manually.

BRIEF DESCRIPTION OF THE DRAWING

The sole FIGURE is a schematic block diagram of an exposure meter constructed in accordance with the invention.

DESCRIPTION OF THE PREFERRED EMBODIMENT

The illustrated exposure meter comprises a lens 1 which focuses a scene onto a color camera pick up 2; Philips NXA 1020 and associated chips being used in this particular example. This includes a photosensitive plate carrying an array of photosensitive elements arranged in groups of three, one for each color, yellow, green and magenta. An electronic drive circuit 2A is associated with the chip 2 for electronically addressing each element appropriate to each color in turn so as to scan the scene focussed onto the plate. Elements 2 and 2A in combination constitute a color video camera which produces three analog video signals 3, 4 and 5 for yellow, green and magenta respectively. There is a further signal on line 2B which is known as "frame start". The outputs on lines 3, 4 and 5 are passed to respective sample and hold circuits 6, 7 and 8 and then to analogue to digital convertors 9, 10 and 11. The A/D convertors are not binary. They use a special code where one digit represents a ratio of $\frac{1}{3}$ of one aperture value. Numerically this is equal to $\sqrt{2}/6$.

The resulting digital signals, which will be referred to as y, g, and m signals, are presented to a processor P (RCA 1802 being used in this example) via its parallel interface ports. The processor also receives the frame start signal as an interrupt. The processor causes a keyboard 12 to be scanned in order to see which, if any, of its keys M, +, −, C, are pressed.

The processor produces in response to the C button, via a suitable interface, three new output signals on lines 13, 14 and 15 which produce a display on a display device 16 which in this example is an LCD display. The signal on line 13 produces a histogram 17. The signal on line 14 defines the position across the display and the length of a bar 18 and the signals on line 15 control numeric data displayed namely; FS value (film speed in ASA units); SS value (shutter speed in seconds or fractions of a second); AV value (aperture value in ratios from F1 to F1:8); CR value (contrast range from 2 to b 16,000:1) and M/S value (a measure of the departure from the color temperature measured from 6000° K. expressed in Mireds). The processor also generates a flash trigger signal on line 19 in response to pressing the C button.

The processor has a stored program which was written in a high level language via a microprocessor development system which compiles the program into machine code, the latter being stored in an EPROM forming part of the processor. The effect of the program is to produce the signals on lines 13, 14, 15 and 19 as follows.

To produce the histogram signal on line 13 the processor converts the digital y, g, and m signals into corresponding Red, Green and Blue signals in accordance with rules known in the art. These are added and divided by three to form an average. Each average value thus obtained represents the light intensity on a group of three y, g, m, color sensors in the pick up 2. The average values are now sorted in cells where each cell spans a range of intensity values of $\sqrt{2}/6$. There are forty-eight of these cells and the number of values in each cell are displayed on the histogram 17. The histogram display is rectangular and is in fact a dot matrix of forty eight horizontal elements and thirty six vertical elements so that the width of the display corresponds to 48/3 aperture values. This amounts to a contrast ratio of 16,000:1.

To produce the bar 18, which has a maximum potential length of forty eight dots and is one dot high, the processor first calculates the length as follows, using a contrast range value which is inserted by the user, with the + and − buttons on the keyboard 12, and which is displayed on the numeric display at CR. This value is selected by the user from information provided by the manufacture of the sensitive material being used in the camera. The length of the bar in dots is the (CR value expressed as a power of 2)×3. The processor now calculates the position of the center of the bar. It does this using an equivalent light value (LV) which it calculates by multiplying SS by AV (to be described later). The position of the center vis-a-vis the width of the display is the product of LV and FS (also to be described later) in units defined by International Standards Organisation.

FS is a value which is inserted by the user. It is the ASA rating of the film speed of the film in the camera. The user inserts this using the + and − keys. In this connection it is explained that operation of the + and − keys adjusts one of the numeric variables marked by a cursor which is moved by successive pressure of the M button on the keyboard 12.

SS is a numeric variable inserted by the operator (again using the + and − keys) and corresponds to the shutter speed to which the camera shutter is set or to be set.

AV is the aperture value which is inserted by the user (again using the + and − keys) and corresponds to the aperture vallue to which the diaphragm of the camera is set or to be set.

The value of M/S is calculated by the processor by taking the average of all the calculated red values over one frame (determined by the frame start signal) and dividing it by the average of all the blue values and selecting a fraction (the M/S value) which when multiplied by the average red value results in the result of divisions being 1 when the pick-up chip is exposed to a source of illumination whose color temperature is 6000° K. When the chip is exposed to a source of illumination of 6100° K. the M/S value is −100 and when the source is 5900° K. the M/S value is +100.

It is believed that the illustrated exposure meter offers the user much more information than any other meter and still allows the user of artistic tone distortion if that is what is required. On the other hand, precise exposure determination is made much simpler to achieve. There has been no attempt to automate the whole system although the microprocessor could be used to alter the shutter speed or the aperture value in order to give aperture or shutter speed priority. In this style of meter it is felt that this would be a retrograde step.

What is claimed is:

1. An exposure meter comprising:
    means for deriving different values defining the brightness of different parts of a field of view, said means for deriving different values deriving at least two separate values for each part of the field of view, these two values representing the brightness of different color components;
    means defining a number of cells into which the said brightness values may fall;
    means for providing measures of the number of said brightness values in each cell;
    display means for displaying the measures of the number of brightness values in each cell;
    means for permitting manual entry of a film speed value, an aperture value and a shutter speed value;
    means for producing a second display, alongside the first mentioned display, showing the range of luminance values which can be handled by the particular film in use at the manually entered aperture and shutter speed; and
    means for using said separate values to derive a measure of the color balance of the field of view.

2. Apparatus according to claim 1 in which the said display means displays the measure of the number of brightness values in each cell in the form of a histogram, the display means having an x and a y axis, the x ordinate being divided into the said brightness cells and the y ordinate representing the number of said parts of the field of view whose luminance falls into a given cell.

3. Apparatus according to claim 1 in which the second display is in the form of a bar alongside the histogram and extending in the x direction over a range of x values representing those luminance values which can be handled.

4. Apparatus according to claim 1 in which the means for deriving the different values includes an array of photosensitive elements and means for scanning the elements in frames to produce the said values.

5. An exposure meter comprising:
    (i) photoelectric sensing means for receiving an image of a field of view and for deriving, for each of different parts thereof, three separate values each defining the brightness of different color components;
    (ii) averaging means for receiving the separate values derived by the photoelectric sensing means and for producing therefrom an average brightness value for each said part of the field of view;
    (iii) contrast indicating means for receiving the average brightness values from the averaging means and for deriving an indication of the contrast in the field of view; and
    (iv) color balance indicating means for receiving the separate brightness values from the photoelectric sensing means and deriving therefrom a measure of the red/blue color balance in the field of view.

6. An exposure meter according to claim 5 wherein the contrast indicating means defines a number of cells into which said average brightness values may fall and includes means for displaying measures of the number of said average brightness values in each cell.

7. An exposure meter according to claim 6 including manually settable data entering means for recording a film speed value FS, an aperture value AV, a shutter speed value SS, and a film contrast range value CR; means for calculating from said values FS, AV, SS and CR, a range of permissible brightness values in a field of view which can be handled by a film having the specified FS and CR values in a camera set to the specified AV and SS values; and means for displaying this range of permissible brightness values alongside the measures of numbers of average brightness values in each cell.

8. An exposure meter according to claim 6 including an A/D converter for receiving an analogue signal defining a brightness value and converting it into a digital code such that one digit represents a present fraction of an aperture value.

* * * * *